INVENTOR.
ROY E. BICKELHAUPT
JAMES F. MASTERSON
BY John A. Young
ATTORNEY

INVENTOR.
ROY E. BICKELHAUPT
JAMES F. MASTERSON
BY John A. Young
ATTORNEY

United States Patent Office 3,019,514
Patented Feb. 6, 1962

1

3,019,514
FRICTION LINING FOR BRAKES, CLUTCHES
AND THE LIKE
Roy E. Bickelhaupt, Urbana, Ill., and James F. Masterson, South Bend, Ind., assignors to The Bendix Corporation, a corporation of Delaware
Filed Dec. 30, 1959, Ser. No. 862,950
19 Claims. (Cl. 29—182.5)

This invention relates generally to a friction lining for brakes, clutches and the like but it is also usable in other applications where a friction material is desired which is wear resistant and has stable properties over a wide temperature range. For example, bearing materials require many of the properties found in this new composition of material and it is to be expected that the unique properties of the composition of matter disclosed herein will adapt it for many applications other than for brakes and clutches which are disclosed herein only as one example of the ways of using the novel material. The present application is a constinuation-in-part of our earlier filed copending application Serial No. 602,480 filed July 20, 1956, now forfeited.

Two previously filed applications, No. 545,637, filed November 8, 1955, now Patent No. 2,784,105 (which is a continuation-in-part of application No. 257,162, filed November 19, 1951, now abandoned) and No. 355,586, filed May 18, 1953, now abandoned, disclose the usage of a related material in high kinetic energy absorbing applications. The desirable properties of the materials in these applications prompted a desire to adapt these materials for lower kinetic energy absorbing applications such as automotive braking, truck braking, clutches, etc.

It was found that these high energy friction materials were not adaptable for some low energy applications. The reasons for this involve differences in operating conditions. Certain transformations which take place at elevated temperatures in the higher energy materials did not occur in the lower energy applications and this is one possible reason for its apparent nonadaptability. Other factors, such as engagement time, application pressure, and speed are important factors which influence the choice of an appropriate friction material and the properties which the material must possess. These additional factors possibly account for nonadaptability of the higher energy friction materials to the lower kinetic energy absorbing applications.

It is an object of this invention to adapt the high kinetic energy absorbing linings disclosed in application No. 545,637 for lower kinetic energy absorbing usage so that they retain the inherently desirable properties of effectiveness (coefficient of friction), wear resistance and temperature stability but are yet capable of operation under entirely different operating conditions.

It is a further object of this invention to provide the material with such properties as reduced abrasive effect on the opposing surface with which it engages in operation, and reduced susceptibility to chatter and "aggressiveness." By "aggressiveness" we mean an instantaneous development of torque by engagement of the friction article with the opposing surface.

It is obvious from the foregoing remarks that a friction material for brakes, clutches and the like must possess a wide assortment of properties, some of which are opposed and must, therefore, be compromised or adapted to a specific usage. On the whole, the present friction material embodies more desirable properties such as low wear rate, effectiveness, stability, etc. and to a greater degree than other friction materials with which we are acquainted. By following the general principles disclosed herein it will be possible for the practitioner skilled in the art to start from a specific application and select the proper ingredients and proportion thereof to arrive at the most suitable material.

An over-all object of the invention, in addition to performance improvement, is that the material is economical to manufacture and economical to the consumer because of its increased service life.

Other objects and features of the invention will become apparent from the following description which proceeds with reference to the accompanying drawings, wherein.

The friction composition shown in the drawing is composed of: a strong, heat resistant and malleable metallic matrix which retains the friction material ingredients in place during use; a frangible ceramic in the form of mullite, said mullite having the properties of anisotropic frangibility so that its multiplicity of apices will re-form into multiples of the original apices during lining wear; a carbonaceous lubricant which may be in the form of flake graphite dispersed throughout the matrix so as to blend therewith (and in some instances a metallic lubricant such as lead); and a lining wear inhibiting ingredient which may consist of a bismuthal addition.

A wide variation of properties is obtainable by varying the constituency of the materials. For example, the matrix may be composed of a copper-tin-zinc combination, but for some and particularly higher temperature applications this may be changed to an all iron or predominately iron matrix. It will be understood that this invention is not limited to a specific matrix composition but includes those variations in matrix composition which are indicated and are related thereto. It will be further understood that certain of the materials can be deleted for some applications. The lead lubricant, for example, can in certain instances be omitted. Generally, a specific application of the friction material is selected and then the most appropriate friction material is fabricated by applying the general teachings of this disclosure.

To facilitate an understanding of the invention we have subdivided the friction material into various groupings designated "Matrix," "Ceramic," "Lubricant," and "Wear Inhibitor." This same method of analysis was followed in previously filed application No. 545,637. Each of these groupings will be separately considered and explained in some detail according to the ingredients thereof and their respective functions in the friction material.

Starting with the basic metal matrix-ceramic-carbonaceous lubricant combination which was disclosed in application No. 545,637, it was discovered that such a lining would wear at excessive rates for lower kinetic energy absorbing applications. A significant reduction in wear rate can be achieved by adding a "wear inhibitor" consisting of bismuthal additives or equivalents thereof. The bismuthal additive imparts greater resistance to lining wear so that the material now includes, in addition to the matrix-ceramic a further class of materials titled "Wear Inhibitors." This improved material is generally "non-chattering" and has less noise, lower wear rate and less tendency to score the opposing engageable surface.

A further stage in development of the lining is elimination of the carbonaceous lubricant with the result being an ever further decrease in wear rate thus making it particularly adaptable for some applications. In this case the lining comprises matrix, ceramic, and wear inhibitor. With this last mentioned combination of ingredients, however, there is greater tendency of the lining to produce chatter and create more noise. To correct for this, a metallic lubricant, lead may be added to suppress chatter. The lead causes no increase in wear rate of the article.

It will become evident from the following description that the classification of lining ingredients under the headings "Matrix"—"Ceramic"—"Lubricant"—"Wear Inhibitor" is at times arbitrary and it will also be apparent that in the selection of ingredients and proportions thereof it has been necessary to strike some balance between opposing qualities and this balance is obtained by making the indicated changes in composition.

Grouping the materials under the indicated headings of "Matrix," "Ceramic," etc. provides the best means of predicting the type of ingredients which are needed in the lining and also provides some basis for predicting the performance of the material.

MATRIX

The principal function of the matrix material is to hold the latter described friction producing ceramic material in rubbing contact with the opposing friction surface of a friction producing structure. The matrix consists of finely comminuted metallic particles which are sinterable to form a continuous metallic phase supporting the ceramic friction producing material. Any suitable sinterable metal may be used; and in choosing the appropriate matrix, heat resistivity is of great importance. The lower melting point metals such as antimony-copper alloys, and copper-tin-zinc alloys are suitable for lower kinetic energy applications viz., automobile brakes, truck clutches, etc. The heat resistivity is an important consideration because of the necessity for holding the other ingredients in place and providing cohesiveness to the friction material. It is required that the matrix will hold the ceramic material in engagement with the opposing rubbing friction surface.

Friction material matrices which have been found satisfactory include: copper, antimony, iron, nickel, and alloys of these metals. Other suitable matrix materials will suggest themselves to those skilled in the art. Specific formulae having these matrices are:

*Formula 1*

| | Percent |
|---|---|
| Copper | 60.0 |
| Mullite | 20.0 |
| Silica | 5.0 |
| Bismuth | 15.0 |

*Formula 2*

| | |
|---|---|
| Antimony | 75.0 |
| Mullite | 20.0 |
| Silica | 5.0 |

*Formula 3*

| | |
|---|---|
| Iron | 67.5 |
| Mullite | 20.0 |
| Silica | 5.0 |
| Bismuth | 7.5 |

*Formula 4*

| | Percent |
|---|---|
| Nickel | 67.5 |
| Mullite | 20.0 |
| Silica | 5.0 |
| Bismuth | 7.5 |

*Formula 5*

| | |
|---|---|
| Copper | 70.0 |
| Antimony | 5.0 |
| Mullite | 20.0 |
| Silica | 5.0 |

*Formula 6*

| | |
|---|---|
| Copper | 44.5 |
| Zinc | 7.5 |
| Mullite | 35.0 |
| Silica | 5.0 |
| Bismuth | 8.0 |

Where the friction material is apt to chatter, thus causing objectionable low frequency vibrations, it is sometimes advisable to provide low melting point additives to the matrix which may provide lubrication at the lining surface. It is thus provided that the lining surface can soften without detracting from cohesiveness of the matrix or producing the previously mentioned smearing of matrix metals over the engageable lining surface.

CERAMIC

The primary function of the refractory ceramic ingredients is to provide solid particles in rubbing contact with the opposing friction surface. Locally high temperatures may be produced on the particles of ceramic which "plough" into, or rub against the opposing surface; and because they do not soften or smear at the locally high temperatures which can be produced, they are uniquely suitable for use as friction producing ingredients. Our preferred ceramic material consists of mullite. Most ceramics can be used, although all, or most all will produce greater wear of the opposing surface than the mullite. Examples of other ceramics which can be used are alumina ($Al_2O_3$), silica ($SiO_2$), and magnesia ($MgO$).

*Formula 7*

| | Percent |
|---|---|
| Copper | 67.5 |
| Silica | 15.0 |
| Bismuth | 10.0 |
| Graphite | 7.5 |

*Formula 8*

| | |
|---|---|
| Copper | 67.5 |
| Alumina | 15.0 |
| Bismuth | 10.0 |
| Graphite | 7.5 |

*Formula 9*

| | |
|---|---|
| Copper | 67.5 |
| Magnesia | 15.0 |
| Bismuth | 10.0 |
| Graphite | 7.5 |

The mullite is derived from calcining naturally occurring minerals such as sillimanite, andalusite, or kyanite, this reaction being represented by the following equation:

$$3(Al_2O_3 \cdot SiO_2) \xrightarrow{\text{heat}} 3Al_2O_3 \cdot 2SiO_2 + SiO_2$$

The mullite may also be made by fusing the appropriate stoichiometric quantity of alumina and silica. The mullite is used generally for its unique properties relating to wear and effectiveness while it is combined with a suitable metallic matrix.

The mullite (or calcined kyanite) is used in particle size ranging from about −35 mesh to about −200 mesh. The desirable particle size selected is determined by the specific application.

There is no practical limitation on the amount of ceramic which is used. Depending upon the metallic binder (or matrix) which is selected, ceramic can be used up to the limits of the binder's ability to retain the lining together. It may be said generally, however, that the wear rate of the friction lining is high when the amount of ceramic is insignificant in amount and the wear rate of the friction lining is also high when the ceramic amount is so great that there is insufficient matrix to adequately hold the lining together. It is the combination of ceramic and the suitable metal matrix which is significant and not the relative amounts thereof. Further details of usable amounts of ceramic are disclosed in application No. 545,637. The ceramic content of the lining may also include amounts of silica, alumina, and magnesia to supplement the friction properties of the principal ceramic friction producing material.

LUBRICANT

A lubricant, other than our later described Wear Inhibitor, is not required for our later described Wear Inhibitor to produce its synergistic effect. Lubricants, particularly graphite, weaken the sintered friction materials; and the addition of our Wear Inhibitors to sintered materials containing graphite, seem to greatly increase their life and wear resistance. Since lubricants are generally used, and our Wear Inhibitors have particular advantages when used with other lubricants, lubricants generally will now be discussed.

The lubricant is subdivided between "metallic" and "carbonaceous" materials, which may be used separately or in combination. For purpose of explanation, they will be considered separately.

The carbonaceous material may be added in the form of flake graphite. The flake graphite size may vary considerably but we have found that the most desirable size is less than about −325 mesh.

We have further found that the graphitic lubricant works best when it is combined with the matrix rather than the ceramic. Thorough mixing of the materials and reduction of the lining materials to remove agglomerated formations is essential.

Figure 1:
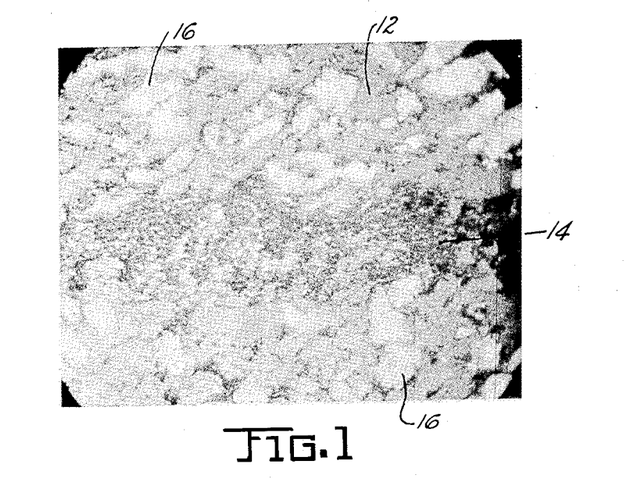
FIGURES 1 and 2 are lining surface photomicrographs (magnification 150×) showing different structures obtainable with nondispersed and dispersed graphite.

There is a tendency for finely divided metals, ceramic, and graphite to "ball up" and form agglomerates. These agglomerates are broken up by successive screening and mixing steps which are carried out until the materials are thoroughly mixed and the graphite becomes blended with the metallic particles. This may also be accomplished with a disintegrator type blender. Once the graphite is dispersed and blended in the matrix, a wetting agent such as oil is added to prevent segregation of the materials. Photomicrographs show a definite difference in structure when the graphitic lubricant is highly dispersed. Referring to FIGURE 1, there is shown a photomicrograph of a lining sample in which the graphite is not dispersed throughout the matrix. Identifiable in the photograph are matrix 12, graphite 14, and calcined kyanite 16. Note that the graphite particles 14 are in agglomerated form and are therefore not completely in association with the matrix 12.

Figure 2:
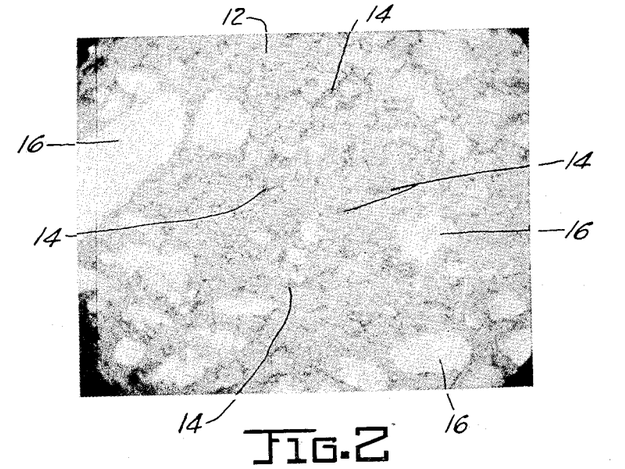

Referring now to FIGURE 2, note how the graphite particles 14 are reduced in size and have become fairly uniformly distributed through the matrix 12. The finer particle size has resulted in a complete blending of the graphite 14 within matrix 12. When the lining is provided with highly dispersed graphite it appears to operate in conjunction with the matrix 12 rather than the ceramic 16. When the graphite is not dispersed, and is in association with the ceramic 16 rather than the matrix 12 (see FIGURE 1), then there is a tendency for the lubricant to be easily pulled out of the matrix rather than providing a lubricating film at the surface of lining.

The dispersed graphite influences the lining in several important respects and it is theorized that this influence is related to a glaze formation on the surface of the friction lining. It has been determined that the dispersed graphitic addition tends to break up the formation of glaze on the surface of the lining. Note FIGURE 3 which is a photograph of a lining differing from the lining in FIGURE 4 by the addition of dispersed graphite. The linings in FIGURES 3 and 4 have been subjected to the same operating conditions. The lining shown in FIGURE 3 is composed of:

*Formula 10*

| | Percent |
|---|---|
| Copper | 70.5 |
| Graphite | 7.5 |
| Bismuth | 10.0 |
| Calcined kyanite | 12.0 |

Figures 3, 4, 5:
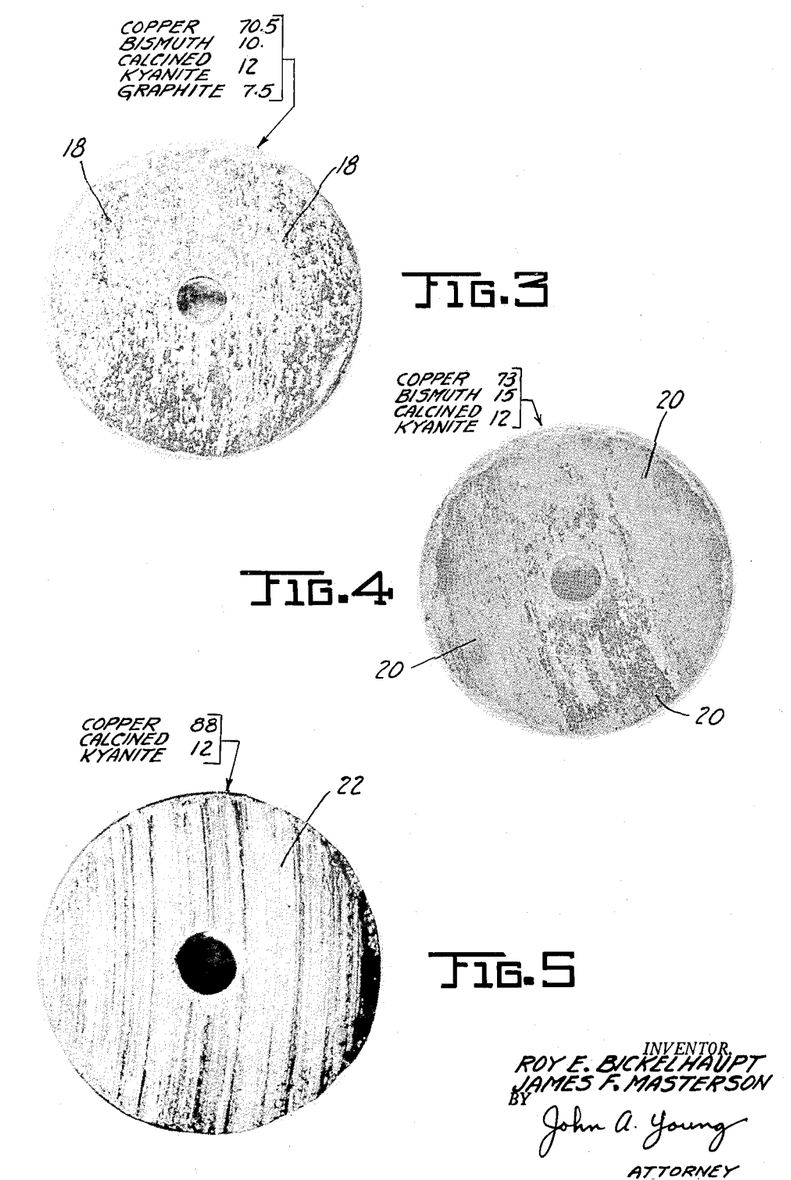
FIGURES 3, 4, and 5 are photographs of lining segments after they have been tested on a button tester. Each segment has been tested identically; each has been subjected to about ninety applications and has been elevated to about 400° F.

The lining shown in FIGURE 4 is composed of:

*Formula 11*

| | Percent |
|---|---|
| Copper | 73.0 |
| Calcined kyanite | 12.0 |
| Bismuth | 15.0 |

Note how the glaze formation 18 on the surface of the lining segment in FIGURE 3 is discontinuous whereas the glaze formation 20 on the surface of the lining segment in FIGURE 4 is continuous.

It has been found that the dispersed graphite, either because of this influence on glaze formation or for some unappreciated reason, does reduce the effect of wear on the opposing surface.

The dispersed graphite reduces tendency for "chatter" in clutch or brake operation and also reduces noise during engagement. There is some evidence that the dispersed graphite minimizes torque buildup and suppresses chatter because of the formation of a lubricating film at the surface of the lining.

The dispersed graphite has proved useful in the ranges of about 4% to about 15%. The amount of graphite may vary considerably depending on the matrix because the various matrix metals differ in the cohesiveness which they provide the lining. Other factors determining amount of graphite are sintering temperatures and processing conditions. We have found that the graphite tends to reduce the strength of the lining by detracting from the cohesiveness thereof. Examples of lining formulations having dispersed graphite are as follows:

*Formula 12*

| | Percent |
|---|---|
| Copper | 71.0 |
| Graphite | 4.0 |
| Mullite | 12.0 |
| Silica | 3.0 |
| Bismuth | 10.0 |

*Formula 13*

| | |
|---|---|
| Copper | 59.0 |
| Tin | 3.5 |
| Graphite | 7.5 |
| Mullite | 15.0 |
| Bismuth | 7.5 |
| Lead oxide | 7.5 |

*Formula 14*

| | |
|---|---|
| Copper | 65.0 |
| Graphite | 10.0 |
| Mullite | 12.0 |
| Silica | 3.0 |
| Bismuth | 10.0 |

There is a relation between the "wear inhibitor" addition to the lining and the dispersed graphite addition since the former appears to promote the formation of glaze and the latter controls extent of glaze formation to obtain a preferred wear, effectiveness, and operational "smoothness" pattern for the lining. While additions of dispersed graphite do have the effect of increasing the wear rate of the lining, this is adequately compensated for by "wear inhibitor" additions.

For some applications, when the device using the lining is not sensitive to chatter, and wear of the opposing surface is not a substantial factor, we have provided satisfactory ceramic, metal, "wear inhibitor" linings without graphite lubricant.

It is important to clutch and brake application that the lining not be too "aggressive" in operation. We have found that lead additions remedy this tendency for over-aggressiveness of the lining because the lead will reduce the coefficient of friction of the lining. This property of "over-aggressiveness" is to be understood as a relative term and it is not essential or even desirable to compensate for this in many applications. For specific formulae having lead as a metallic lubricant addition, there are the following lining compositions:

*Formula 15*

| | Percent |
|---|---|
| Copper | 54.5 |
| Tin | 8.5 |
| Mullite | 20.0 |
| Silica | 5.0 |
| Bismuth | 7.0 |
| Lead | 5.0 |

*Formula 16*

| | |
|---|---|
| Copper | 52.5 |
| Tin | 8.0 |
| Mullite | 20.0 |
| Silica | 5.0 |
| Bismuth | 7.0 |
| Lead | 7.5 |

*Formula 17*

| | |
|---|---|
| Copper | 50.5 |
| Tin | 7.5 |
| Mullite | 20.0 |
| Silica | 5.0 |
| Bismuth | 7.0 |
| Lead | 10.0 |

The lead addition has a further beneficial effect in reducing the tendency of the lining to groove or score the opposing enagageable surface. Lead in its combined forms also has this corrective effect. Lead oxide, for example, has been used as an equivalent for lead in its elemental form. An important characteristic of lead is that while it imparts its lubricating effect to the lining, there is less weakening of the lining then as caused by graphite. Lead, lead oxide, and its readily oxidizable forms can be used in amounts from 0–20%. Above approximately 20% the matrix tends to be weakened to such a degree as to, in most instances, not warrant the use of higher percentages. When lead in any of its effective forms is used we have found that as low as 1% of the Wear Inhibitor materials are quite affective.

*Formula 18*

| | Percent |
|---|---|
| Copper | 76.75 |
| Tin | 3.50 |
| Mullite | 12.00 |
| Bismuth | 5.00 |
| Lead oxide | 2.75 |

*Formula 19*

| | |
|---|---|
| Copper | 72.0 |
| Tin | 3.5 |
| Mullite | 12.0 |
| Bismuth | 5.0 |
| Lead oxide | 7.5 |

*Formula 20*

| | |
|---|---|
| Copper | 67.5 |
| Tin | 3.5 |
| Mullite | 12.0 |
| Bismuth | 5.0 |
| Lead oxide | 12.0 |

WEAR INHIBITOR

The wear inhibiting materials which we have found most effective are bismuth, and its forms which will provide oxides of bismuth on the rubbing friction producing surfaces during use. Presumably the wear inhibiting material can be applied to the rubbing friction surfaces in any suitable manner as by rubbing a block of the material on one of the surfaces during use; but its application can best be controlled by its uniform distribution throughout the sintered powdered friction material. The oxides and readily oxidizable forms of bismuth become increasingly effective as their amount is increased up to from about 3% to 5% and thereafter their effectiveness seems to be less but may increase until it comprises from about 15% to 20% of the sintered friction material. We may say therefore that the oxides and readily oxidizable forms of bismuth such as the sulfides, carbonates, sulfates etc., are effective in amounts of from approximately 1% to approximately 20%. As a practical matter from about 3% to about 10% will be optimum in most instances. By the expression "readily oxidizable forms" we mean forms which will convert; to the oxides during sintering and/or use.

Refer next to FIGURES 4 and 5 which are surface photographs of two linings differing by the addition of a wear inhibiting agent. The lining formulation shown in FIGURE 5 consists of:

*Formula 21*

| | Percent |
|---|---|
| Copper | 88.0 |
| Calcined kyanite | 12.0 |

The lining formulation shown in FIGURE 4 is substantially the same but also includes 15% of bismuth. These linings have been run on a button testing machine (not shown) which is specially designed to evaluate friction linings.

The lining shown in FIGURE 4, having the bismuth therein, can be contrasted with the lining shown in FIGURE 5 by the formation of a glaze 20 on the surface thereof, which glaze consists predominantly of iron oxide in its lower and intermediate valence forms, FeO, $Fe_3O_4$ and possibly oxide of bismuth to a varying degree. This layer of glaze 20 has formed on the surface of the lining in FIGURE 4 and not on the surface 22 of the lining in FIGURE 5 even though they have both been subjected to the same operating conditions. This is the evidence that the bismuth addition promotes the rate of formation of iron oxide glaze at lower operating temperatures.

If the operating temperatures were sufficiently high (for example, 600° F.) the iron oxide formation would occur even in the absence of bismuth. This has been our experience in certain clutch installations. The protective coating of iron oxide glaze will not spontaneously occur at the lower temperatures encountered in ordinary clutch and ground vehicle braking at temperatures lower than about 600° F. Other factors such as engagement speed and normal pressure have a substantial influence on glaze formation.

The iron oxide coating is believed to originate from the opposing surface which is generally made of some ferrous material. The iron oxide glaze or coating is believed to have an effect on the wear rate of the article.

In those applications where additions of graphite were necessary to prevent chatter, we have observed a tendency for the lining to wear at excessive rates. This wear rate can be corrected by addition of bismuth.

Figure 6:
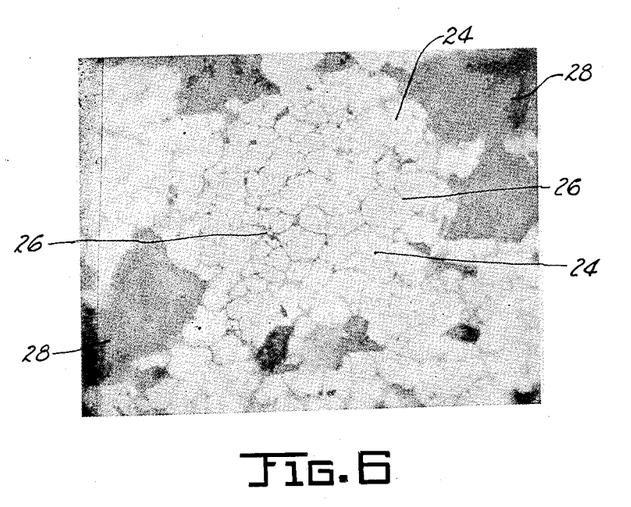
FIGURE 6 is a photomicrograph (magnification 600×) showing a subsurface section view of FIGURE 4.
Figure 7:
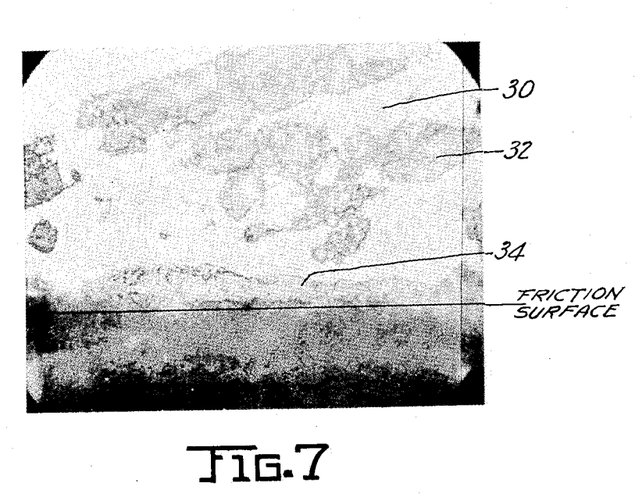
FIGURE 7 is a photomicrograph (magnification 850×) showing in section view the friction surface of FIGURE 4.

Referring to FIGURE 6 which is a structural photomicrograph of a subsurface section of the lining in FIGURE 4, there can be identified copper matrix 24, which has been etched to bring out the grain structure revealing the network of bismuth 26 which has enveloped the grains of copper matrix. Other identifiable parts of the lining are calcined kyanite grains 28. Referring next to FIGURE 7 which is a photomicrograph of a section taken perpendicular to the rubbing surface of FIGURE 4, identifiable are: matrix 30, calcined kyanite 32, and glaze layer 34.

Figure 8:
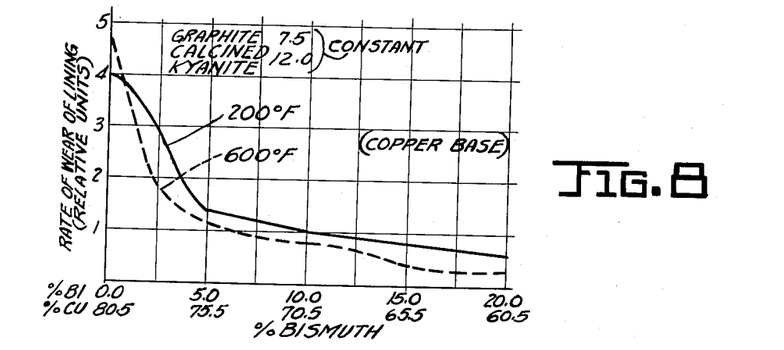
FIGURES 8 and 9 are graphs showing the reduction in lining wear rate obtainable by the addition of bismuth to a friction lining.
Figure 9:
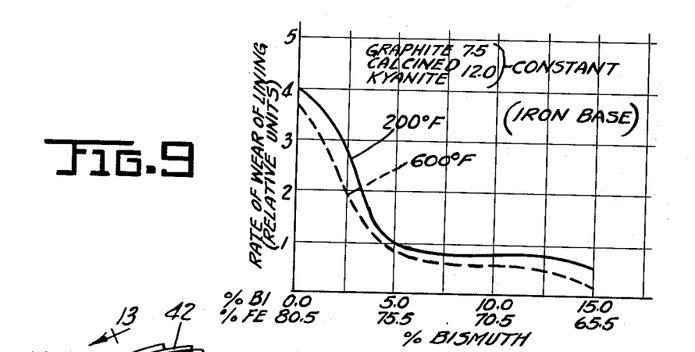

Referring next to FIGURES 8 and 9 where there are shown graphs of two different linings illustrating wear rate (in relative units) vs. amount of bismuth.

The compositional wear rate curves substantiate that wear resistivity is imparted to typical lining compositions as the result of additions of bismuth to a friction lining. This wear rate reduction has been obtained both at low operating temperature conditions (260° F.) and relatively higher operating temperature conditions (600° F.). There is further established from these curves that the function of the bismuth is not affected by a change in composition of the matrix. For example the bismuth provides improvement both with copper and iron matrices. It will be further substantiated from these graphs that as little as 1% bismuth provides some improvement in lining wear but to realize maximum advantage of the bismuth, amounts ranging from about 3% to about 15% can be used. When amounts of bismuth greater than 15% are added, proportional improvement is not realized. There is no element of criticality involved in these ranges; it is simply a matter of adding bismuth until further additions no longer yield a factor of improvement.

It is possible that the bismuth reduces lining wear rate because of some phenomena involving the formation of a glaze layer such as indicated at 34 in FIGURE 7, but it is sufficient for this disclosure to be cognizant of this relation between bismuth addition and wear rate reduction regardless of the reason why it so functions.

Figure 10:
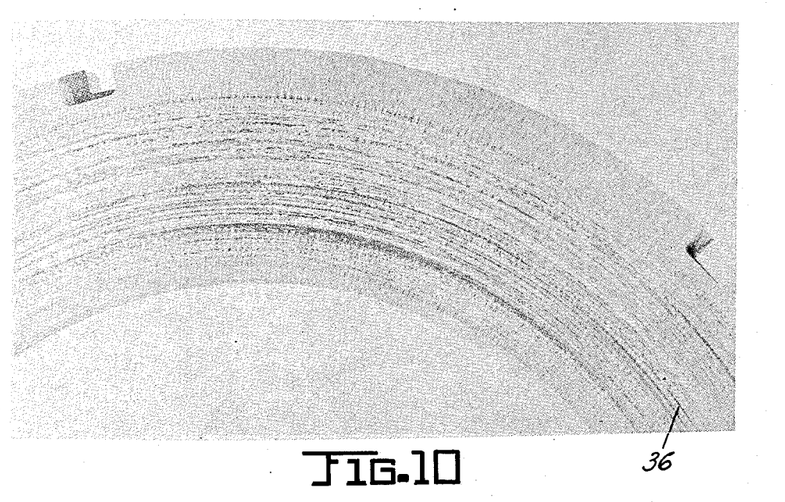
FIGURES 10 and 11 show the opposing surface of rotors used with linings shown in FIGURES 5 and 4 respectively.
Figure 11:
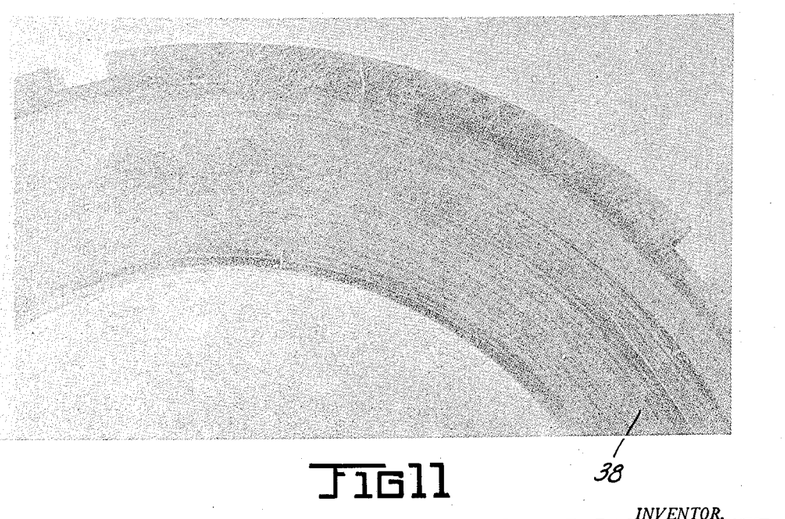

The bismuth addition has a further beneficial effect in reducing scoring or grooving of the opposed surface which is the rotor or drum in the case of brake constructions or the flywheel in the case of clutch constructions. Referring to FIGURES 10 and 11 the effect of adding bismuth to a lining will be described in relation to opposing surface condition. FIGURE 10 shows a rotor surface 36 which has been used in conjunction with a friction lining not containing bismuth. Note the undesirable scored or grooved areas and the generally damaged condition of the rotor. Contrast this with the rotor surface 38 in FIGURE 11 which shows a rotor that has been tested with a lining having bismuth and note that the contacted surface 38 does not have the scored and damaged condition of the rotor in FIGURE 10. The lining composition used with the rotor in FIGURE 10 is the same as that shown in FIGURE 5; and the lining compositions used with the rotor in FIGURE 11 is the same as that shown in FIGURE 4.

When the rotor surface is damaged, this necessitates replacement of the rotor or flywheel and is an added item of maintenance expense. Also, a damaged opposing surface which is badly scored tends to promote excessive wear of the friction lining and makes the brake or clutch more prone to chatter. It is of interest to note that the lead previously described as a lubricant also tends to prevent damage of the opposing surface.

Experimentation indicates that antimony and cadmium reduce to some extent the illustrated scoring effect of the lining on the opposing surface. Cadmium sublimes, however, so that its use is hardly practical; and antimony dissolves in copper so that its effectiveness is much less than bismuth. The oxides once produced on or added to the rubbing surfaces inhibit wear, however; and readily oxidizable compounds such as the sulfides, sulfates, carbonates and oxalates can be used.

*Formula 22*

| | Percent |
|---|---|
| Copper | 50.0 |
| Mullite | 25.0 |
| Silica | 5.0 |
| Antimony | 20.0 |

We have also used combinations of bismuth-cadmium and bismuth-antimony. Examples of this are as follows:

*Formula 23*

| | Percent |
|---|---|
| Copper | 50.0 |
| Mullite | 25.0 |
| Silica | 5.0 |
| Cadmium | 12.5 |
| Bismuth | 7.5 |

*Formula 24*

| | |
|---|---|
| Copper | 50.0 |
| Mullite | 25.0 |
| Silica | 5.0 |
| Antimony | 12.5 |
| Bismuth | 7.5 |

The bismuth, as indicated, can be replaced in part by equivalent amounts of antimony and cadmium. In one instance the matrix was formed of antimony and no bismuth was required to preserve the opposing surface. The antimony in this instance, in addition to its matrix function, also served the same function as did the bismuth. Refer back to Formula 2, column 3.

Sintered alloys of bismuth and lead have also proved satisfactory in reducing lining wear rate and eliminating scoring of the opposing surface. In this case lead oxide, which is much lower in cost than bismuth, has replaced a portion of the bismuth without substantial reduction in anti-scoring and wear resisting effects of the bismuth.

A comparison of linings in which lead oxide is substituted for a fraction of the bismuth, is as follows: Each lining specimen was subjected to about one thousand applications to determine the wear rate of the articles. Note that the same ratio of copper, kyanite, tin, and graphite is used in each case:

| Formula 25 (A) | | Formula 26 (B) | | Formula 27 (C) | |
|---|---|---|---|---|---|
| Copper | 67⎤ | Copper | 67⎤ | Copper | 67⎤ |
| Kyanite | 12 | Kyanite | 12 | Kyanite | 12 |
| Tin | 3½ ⎬90% | Tin | 3½ ⎬95% | Tin | 3½ ⎬90% |
| Graphite | 7½ | Graphite | 7½ | Graphite | 7½⎦ |
| Bismuth | 10% | Bismuth | 5% | Bismuth | 5% |
| | | | | Lead Oxide | 5% |
| Wear Rate $R_A$=.012" | | Wear Rate $R_B$=.018" | | Wear Rate $R_C$=.010" maximum wear | |

$R_B > R_A$; $R_B > R_C$; $R_A > R_C$

From this evidence we conclude that sintered lead-bismuth alloys are the equivalent of bismuth in providing greater wear resistance to graphitic lubricant linings.

The bismuthal additive linings, while preserving a smooth opposing surface, do have a tendency to wear a track in the opposing surface. This tendency can, however, be easily remedied by the use of a suitable opposing surface material.

COMPARISON OF LINING COMPOSITIONS ACCORDING TO OPERATING CONDITIONS

As mentioned previously in this disclosure, the proper selection of lining material depends upon various operating factors which include temperature, relative speed, engagement pressure, engagement time, etc. To illustrate how lining compositions may be varied to meet these varying operation conditions there is set forth in the following table, a comparison of various linings against a standard lining.

In considering this table it will be noted that temperature and engagement pressure effect the performance of the friction material, and that performance deficiencies are correctable by suitable additions to the lining.

Formula 28

STANDARD LINING

| | Percent |
|---|---|
| Copper | 67.5 |
| Mullite | 12.0 |
| Silica | 3.0 |
| Graphite | 7.5 |
| Bismuth | 10.0 |

| | Formula 29, Lining "a" | Formula 30, Lining "b" | Formula 1, Lining "c" |
|---|---|---|---|
| Copper......percent.. | 75.0 | 77.5 | 60.0 |
| Mullite......do.... | 20.0 | 12.0 | 20.0 |
| Silica......do.... | 5.0 | 3.0 | 5.0 |
| Graphite......do.... | | 7.5 | |
| Bismuth......do.... | | | 15.0 |

I. LOW TEMPERATURE (200° F.)

| Properties | Contains neither Bismuth or Graphite | Contains Graphite but no Bismuth | Contains Bismuth but no Graphite |
|---|---|---|---|
| A. Effectiveness | Higher | Higher | Lower. |
| B. Torque Buildup | Worse | Equal | Worse. |
| C. Wear Rate of Article | Higher [1] / Lower [2] | Much higher | Lower. |
| D. Wear Rate of Opposing Surface | Higher [1] / Lower [2] | Lower | Higher. |

II. HIGH TEMPERATURE (500°–700° F.)

| | | | |
|---|---|---|---|
| A. Effectiveness | Lower | Equal | Equal. |
| B. Torque Buildup | Equal | Equal | Equal. |
| C. Wear Rate of Article | Less Wear | Much higher | Lower. |
| D. Wear Rate of Opposing Surface | Equal | Less | Higher. |

[1] High normal load (300 p.s.i.).
[2] Low normal load (50 p.s.i.).

PROCESSING

Figure 12:
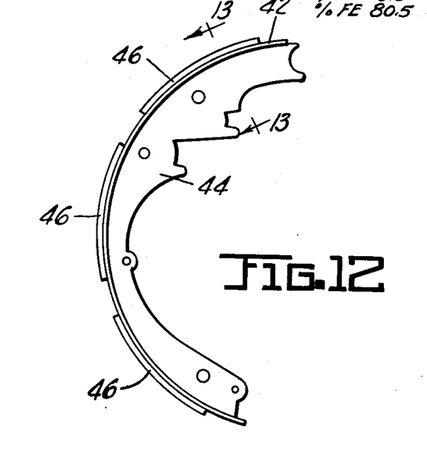
FIGURE 12 shows a brake shoe using the present friction material.
Figure 13:
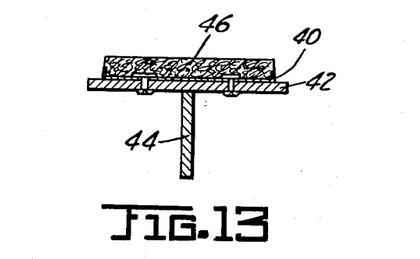
FIGURE 13 is a section view taken on line 13—13 of FIGURE 12.

The processing for the linings is approximately the same in each case. To illustrate a typical lining processing, however, Formula 19 will be used as an example. The powdered metals forming the matrix, the ceramic, the wear inhibitor (bismuth or its equivalent), lead, and graphite which have been previously screened to the previously indicated particle size, are thoroughly mixed and blended in a conical blender and the constituents are reduced to remove all agglomerates. The blending is continued until mixture dispersal is homogeneous. This will take approximately one hour but can vary depending on machinery and particle size. Next, the material is wet by oil to prevent segregation and the material is then compacted in a retaining cup 40 (FIGURE 12) at a pressure of about 60,000 p.s.i. As indicated the retaining cup may consist of a shallow lipped backing member. The compact, for example, the one having the composition of Formula 18 is next heat treated at about 1575° F. for about one and one-half hours to cause sintering of the matrix. The article is now formed into a cohesive friction article. If desired, the friction material may be pressurized once again after sintering to remove any porosity in the sintered article. This second pressure may be about 100,000 p.s.i.

As a general rule, it is desired to sinter the material at as high a temperature as possible without causing "run-out" (loss of any metal constituents by melting) of any of the materials, since the higher sintering temperatures develop greater internal strength for the lining and thus promote the wear life thereof.

The following table lists other tests which have been made. In the tests listed all have been prepared and tested in generally the same manner as that described for the preceeding examples with the exception that the materials of test A–34 through 41, 50, 51, 52, 54, 57, 58, 64, 67, 68 and 69 were sintered in a nitrogen atmosphere instead of an exo atmosphere. Also the materials of tests A–57 and 58 were sintered at 1200° F., and A–54, 61 and 62 were sintered at 1000° F.

| Test No. | Composition | | | | | Avg./Wear/Surf./Stop×10⁵ in inches | | Dynamic Coefficient of Friction | | | | Rotor Score Rating | |
|---|---|---|---|---|---|---|---|---|---|---|---|---|---|
| | Copper | Kyanite | Graphite | Bismuth | Other | 200° F. | 600° F. | 200° F. Initial | 200° F. Stabilized | 600° F. Initial | 600° F. Stabilized | 200° F. | 600° F. |
| A-1 | 80 | 20 | | | | 8.6 | 3.9 | .49 | .25 | .49 | .27 | 2 | 2 |
| A-2 | 75 | 20 | | 5 | | 2.4 | 6.9 | .22 | .38 | .32 | .31 | 1 | 2 |
| A-3 | 70 | 20 | | 10 | | 0.2 | 4.5 | .20 | .31 | .33 | .33 | 1 | 2 |
| A-4 | 65 | 20 | | 15 | | 0.0 | 3.1 | .19 | .26 | .19 | .29 | 2 | 2 |
| A-5 | 80 | 12 | 8 | | | 406.0 | 952.0 | .52 | | .58 | | 2 | |
| A-6 | 75 | 12 | 8 | 5 | | 8.4 | 65.5 | .24 | .32 | .27 | .38 | 2 | 2 |
| A-7 | 70 | 12 | 8 | 10 | | 4.2 | 27.8 | .20 | .25 | .26 | .32 | 3 | 3 |
| A-8 | 65 | 12 | 8 | 15 | | 2.4 | 26.7 | .20 | .25 | .24 | .37 | 2 | 2 |
| A-9 | 76 | 12 | 8 | | 4 Sn | 74.0 | 270.0 | .46 | .40 | .45 | | 2 | |
| A-10 | 71.2 | 12 | 8 | 5 | 3.8 Sn | 2.8 | 36.0 | .20 | .35 | .22 | .36 | 1 | 2 |
| A-11 | 66.5 | 12 | 8 | 10 | 3.5 Sn | 2.5 | 27.0 | .18 | .30 | .35 | .36 | 2 | 2 |
| A-12 | 61.7 | 12 | 8 | 15 | 3.3 Sn | 2.1 | 30.0 | .20 | .23 | .27 | .40 | 2 | 2 |
| A-13 | 80 | | 20 | | | 4,350.0 | 18.8 | .44 | | .19 | .09 | 1 | 1 |
| A-14 | 75 | | 20 | 5 | | 61.5 | 3.1 | .09 | .10 | .13 | .10 | 2 | 1 |
| A-15 | 70 | | 20 | 10 | | 11.0 | 11.5 | .09 | .11 | .12 | .13 | 1 | 2 |
| A-16 | 65 | | 20 | 15 | | 3.2 | 19.0 | .09 | .10 | .11 | .11 | 1 | 2 |
| A-34 | 70 | 20 | | 10 | | 0.3 | 2.7 | .24 | .30 | .18 | .31 | 1 | 2 |
| A-35 | 70 | 20 | | | 10 Bi₂O₃ | 2.8 | 6.2 | .23 | .36 | .42 | .30 | 2 | 3 |
| A-36 | 70 | 12 | 8 | 10 | | 6.9 | 26.8 | .22 | .27 | .29 | .31 | 2 | 3 |
| A-37 | 70 | 12 | 8 | | 10 Bi₂O₃ | 6.2 | 26.4 | .18 | .30 | .25 | .31 | 2 | 2 |
| A-38 | 71.2 | 12 | 8 | 5 | 3.8 Sn | 1.9 | 31.3 | .18 | .34 | .29 | .35 | 1 | 2 |
| A-39 | 71.2 | 12 | 8 | | 3.8 Sn / 5 Bi₂O₃ | 7.2 | 43.2 | .18 | .36 | .23 | .36 | 2 | 3 |
| A-40 | 65 | | 20 | 15 | | 6.0 | 20.1 | .10 | .15 | .11 | .15 | 1 | 2 |
| A-41 | 65 | | 20 | | 15 Bi₂O₃ | 5.0 | 11.8 | .10 | .12 | .13 | .14 | 1 | 1 |
| A-50 | 80 | 12 | 8 | | | 406 | 685 | .54 | .50 | .54 | .50 | 1 | 1 |
| A-51 | 70 | 12 | 8 | 10 | | 3 | 15 | .25 | .32 | .20 | .36 | 3 | 3 |
| A-52 | 70 | 12 | 8 | | 10 Bi₂O₃ | 4 | 37 | .27 | .35 | .35 | .35 | 3 | 3 |
| A-54 | 71.2 | 12 | 8 | | 8.8 CdO | 46 | 91 | .50 | .43 | .48 | .40 | 1 | 2 |
| A-57 | 73.2 | 12 | 8 | | 6.8 Sb₂O₃ | 27 | 164 | .46 | .39 | .39 | .43 | 1 | 2 |
| A-58 | 73.2 | 12 | 8 | | 6.8 Sb₂O₃ | 61 | 192 | .40 | .40 | .43 | .41 | 1 | 2 |
| A-61 | 70 | 12 | 8 | 10 | | 3 | 28 | .29 | .31 | .33 | .35 | 2 | 3 |
| A-62 | 80 | 12 | 8 | | | 382 | 882 | .60 | .50 | .56 | .50 | 2 | 2 |
| A-64 | 75 | 12 | 8 | | 5 Sb₂S₃ | 42 | 86 | .41 | .40 | .46 | .38 | 2 | 2 |
| A-66 | 75 | 12 | 8 | | 5 Sb₂S₃ | 38 | 101 | .46 | .37 | .43 | .38 | 2 | 2 |
| A-67 | 70 | 12 | 8 | 10 | | 2 | 35 | .27 | .33 | .22 | .35 | 2 | 3 |
| A-68 | 70 | 12 | 8 | 10 | | 16 | 32 | .25 | .35 | .23 | .37 | 2 | 3 |
| A-69 | 70 | 12 | 8 | 10 | | 6 | 40 | .28 | .32 | .25 | .35 | 2 | 3 |

The figures in the above chart concerning Composition are in percentages by weight. In the Rotor Score Rating columns, numeral 1 indicates below normal rotor wear, numeral 2 indicates average rotor wear, and numeral 3 indicates more than average rotor wear. The headings of the other columns are believed self explanatory.

We are aware that numerous modifications and revisions will suggest themselves to those skilled in the art and it is to be reasonably expected that such revisions and modifications will lie within the scope of the following claims.

We claim:

1. A sintered friction composition for brakes, clutches and the like consisting essentially of: between about 40% and about 85% of metallic matrix selected from the group consisting of iron, copper, antimony, nickel, zinc, and tin; from about 4% to about 10% of finely divided graphite dispersed throughout said matrix and characterized by intimate association therewith; between about 5% and about 10% of lead, between about 3% and about 20% of bismuth to promote the wear life of said article; and, between about 4% and about 40% of a ceramic friction producing material, said composition being characterized by the formation of a wear resistant glaze when rubbed with another surface in the presence of iron at elevated temperatures.

2. A brake or clutch friction lining consisting essentially of the following combination of constituents:
Matrix: From about 40% to about 85% matrix material of finely divided sinterable metals selected from the group consisting of copper, zinc, tin, iron, antimony, and nickel;
Friction producing ceramic: From about 4% to about 40% of a ceramic friction producing material; and
Wear inhibitor: From about 3% to about 20% of a material that contains atoms from the class consisting of oxidized atoms of bismuth and antimony and atoms of bismuth and antimony which oxidize during operation of the lining, said materials being intimately mixed and reduced to discrete particle size for interdispersal, said combination of materials being heat treated so that said matrix is sintered to form a cohesive friction lining to bind said ingredients together, said lining being characterized by the formation of a wear resistant iron oxide glaze when in rubbing contact with readily oxidizable forms of iron at elevated temperatures.

3. A friction producing device wherein two surfaces are rubbed together to produce surface temperatures below approximately 2500° F. and wherein one of the rubbing surfaces includes a readily oxidizable form of iron: one of said surfaces being formed by a sintered powdered material consisting principally of a powdered metal matrix having a ceramic friction producing material from the group consisting of alumina, silica, magnesia, kyanite, mullite, andalusite and sillimanite distributed uniformly therethrough, said last mentioned one of said surfaces further including from about 3% to about 20% by weight of a material that contains atoms from the class consisting of oxidized atoms of bismuth and antimony and atoms of bismuth and antimony which oxidize during operation of the device for the promotion of a wear resistant iron oxide glaze upon its surface.

4. A friction producing device wherein two surfaces are rubbed together to produce surface temperatures below approximately 2500° F. and wherein one of the rubbing surfaces includes a readily oxidizable form of iron: one of said surfaces being formed by a sintered powdered material consisting principally of a powdered metal matrix having a ceramic friction producing material from the group consisting of alumina, silica, magnesia, kyanite, mullite, andalusite, and sillimanite distributed uniformly therethrough, said last mentioned one of said surfaces further including from about 3% to about 20% by weight of metallic bismuth for the promotion of a wear resistant iron oxide glaze upon its surface.

5. A friction producing device wherein two surfaces are rubbed together to produce surface temperatures below approximately 2500° F. and wherein one of the rubbing surfaces includes a readily oxidizable form of iron: one of said surfaces being formed by a sintered powdered material consisting principally of a powdered metal matrix having a ceramic friction producing material from the group consisting of alumina, silica, magnesia, kyanite, mullite, andalusite and sillimanite distributed uniformly therethrough, said last mentioned one of said surfaces further including from about 3% to approximately 20% of finely divided and uniformly distributed metallic bismuth for the promotion of a wear resistant iron oxide glaze upon its surface.

6. A friction producing device wherein two surfaces are rubbed together to produce surface temperatures below approximately 2500° F.: one of said surfaces including a sintered powdered material consisting principally of a powdered metal matrix having a ceramic friction material distributed uniformly therethrough, said last mentioned surface further including from about 1% to about 20% by weight of bismuth.

7. A friction producing device wherein two surfaces are rubbed together to produce surface temperatures below approximately 2500° F.: one of said surfaces including a sintered powdered material consisting principally of a powdered metal matrix having a ceramic friction material distributed uniformly therethrough, said last mentioned surface further including from about 1% to about 20% by weight of bismuth oxide.

8. A sintered powdered metal article consisting essentially of: from about 2% to about 40% of a ceramic material; from about 40% to about 85% of a sintered powdered metal matrix material whose function it is to hold and support the ceramic material; and from about 1% to about 20% of antimony oxide.

9. A sintered powdered metal article consisting essentially of: from about 2% to about 40% of a ceramic material; from about 40% to about 85% of a sintered powdered metal matrix material whose function it is to hold and support the ceramic material; and from about 1% to about 20% of antimony.

10. A sintered powdered metal article consisting essentially of: from about 2% to about 40% of a ceramic material; from about 40% to about 85% of a sintered powdered metal matrix material whose function it is to hold and support the ceramic material; and from about 1% to about 20% of bismuth.

11. A sintered powdered metal article consisting essentially of: from about 2% to about 40% of a ceramic material; from about 40% to about 85% of a sintered powdered metal matrix material whose function it is to hold and support the ceramic material; and from about 1% to about 20% of bismuth oxide.

12. A sintered powdered metal article consisting essentially of: from about 2% about 40% of a ceramic material; from about 40% to about 85% of a sintered powdered metal matrix material whose function it is to hold and support the ceramic material; from about 1% to about 20% of a material from the group consisting of lead, its oxides, and its readily oxidizable forms; and from about 1% to about 20% of a material from the group consisting of the oxides, and readily oxidizable forms of bismuth.

13. In a friction producing device having two surfaces which are rubbed together in an oxidizing atmosphere to produce elevated surface friction temperatures below approximately 2500° F., and wherein at least one of the rubbing surfaces comprises a form of ferrous material which wears away to form metal particles on said surfaces during use: the addition to one of the rubbing surfaces of from about 1% to about 20% by weight of a material containing atoms of antimony which will be in their oxidized state at the rubbing conditions of the device to cause oxidation of said ferrous particles on said surfaces to a soft powdery oxide of iron which substantially reduces abrasion, gouging and seizure of said surface.

14. In a friction producing device having two surfaces which are rubbed together in an oxidizing atmosphere to produce elevated surface friction temperatures below approximately 2500° F., and wherein at least one of the rubbing surfaces comprises a form of ferrous material which wears away to form metal particles on said surfaces during use: the addition to one of the rubbing surfaces of from about 1% to about 20% by weight of a material containing atoms of bismuth which will be in their oxidized state at the rubbing conditions of the device to cause oxidation of said ferrous particles on said surfaces to a soft powdery oxide of iron which substantially reduces abrasion, gouging and seizure of said surfaces.

15. A friction producing device having two surfaces which are rubbed together in an oxidizing atmosphere to produce elevated surface friction to temperatures below approximately 2500° F., and wherein at least one of the rubbing surfaces comprises a form of ferrous material which wears away to form ferrous particles on said surfaces during use, one of said surfaces being a sintered material consisting principally of a powdered metal matrix having from about 1% to about 20% by weight of bismuth therein.

16. A friction producing device having two surfaces which are rubbed together in an oxidizing atmosphere to produce elevated surface friction temperatures below approximately 2500° F., and wherein at least one of the rubbing surfaces comprises a form of ferrous material which wears away to form ferrous particles on said surfaces during use, one of said surfaces being a sintered material consisting principally of a powdered metal matrix having from about 1% to about 20% by weight of a material containing atoms of bismuth therein which will be in their oxidized state at the rubbing condition to induce oxidation of said ferrous particles during use.

17. In a friction producing device having two surfaces which are rubbed together in an oxidizing atmosphere to produce surface temperatures below approximately 2500° F., and wherein at least one of the rubbing surfaces comprises a form of oxidizable ferrous material which wears away to form ferrous particles during its operation: the addition to at least one of the rubbing surfaces of an effective amount of a material from the class consisting of oxidized atoms of bismuth and antimony and atoms of bismuth and antimony which oxidize during operation of the friction producing device to produce oxidation of the ferrous particles on said surfaces to a soft powdery oxide of iron in which the valence of the iron is lower than its highest valence form and which substantially reduces abrasion, gouging and seizure of said surfaces.

18. In a friction producing device having two surfaces which are rubbed together in an oxidizing atmosphere to produce surface temperatures below approximately 2500° F., and wherein at least one of the rubbing surfaces comprises a form of oxidizable ferrous material which wears away to form ferrous particles during its operation: an effective amount of oxidized atoms of bismuth to produce oxidation of the ferrous particles on said surfaces of a soft powdery oxide of iron in which the valence of the iron is lower than its highest valence form and which substantially reduces abrasion, gouging and seizure of said surfaces.

19. In a friction producing device having two surfaces which are rubbed together in an oxidizing atmosphere to produce surface temperatures below approximately 2500° F., and wherein at least one of the rubbing surfaces comprises a form of oxidizable ferrous material which wears away to form ferrous particles during its operation; an effective amount of oxidized atoms of antimony to produce oxidation of the ferrous particles on said surfaces to a soft powdery oxide of iron in which the valence of the iron is lower than its highest valence form and which substantially reduces abrasion, gouging and seizure of said surfaces.

References Cited in the file of this patent

UNITED STATES PATENTS

| | | |
|---|---|---|
| 1,927,626 | Calkins | Sept. 19, 1933 |
| 2,042,684 | Ejner | June 2, 1936 |
| 2,072,070 | Fisher | Feb. 23, 1937 |
| 2,784,105 | Stedman et al. | Mar. 5, 1957 |
| 2,818,634 | Batchelor et al. | Jan. 7, 1958 |

FOREIGN PATENTS

| | | |
|---|---|---|
| 740,820 | Great Britain | Nov. 23, 1955 |

UNITED STATES PATENT OFFICE
CERTIFICATE OF CORRECTION

Patent No. 3,019,514                  February 6, 1962

Roy E. Bickelhaupt et al.

It is hereby certified that error appears in the above numbered patent requiring correction and that the said Letters Patent should read as corrected below.

Column 14, line 58, after "2%" insert -- to --; lines 64 to 66, for "a material from the group consisting of the oxides, and readily oxidizable forms" read -- atoms --.

Signed and sealed this 7th day of August 1962.

(SEAL)
Attest:

ERNEST W. SWIDER
Attesting Officer

DAVID L. LADD
Commissioner of Patents